United States Patent
Al-Garni et al.

(10) Patent No.: US 9,289,696 B2
(45) Date of Patent: Mar. 22, 2016

(54) WATER DESALINATION SYSTEM USING GEOTHERMAL ENERGY

(71) Applicant: KING FAHD UNIVERSITY OF PETROLEUM AND MINERALS, Dhahran (SA)

(72) Inventors: Ahmed Z. Al-Garni, Dhahran (SA); Wael G. Abdelrahman, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 274 days.

(21) Appl. No.: 14/037,175

(22) Filed: Sep. 25, 2013

(65) Prior Publication Data

US 2015/0083575 A1  Mar. 26, 2015

(51) Int. Cl.
| | |
|---|---|
| B01D 3/00 | (2006.01) |
| B01D 1/00 | (2006.01) |
| F24J 3/08 | (2006.01) |
| B01D 1/22 | (2006.01) |
| B01D 5/00 | (2006.01) |
| C02F 1/16 | (2006.01) |
| C02F 103/08 | (2006.01) |

(52) U.S. Cl.
CPC ............ *B01D 1/0035* (2013.01); *B01D 1/0058* (2013.01); *B01D 1/22* (2013.01); *B01D 5/006* (2013.01); *C02F 1/16* (2013.01); *F24J 3/081* (2013.01); *C02F 2103/08* (2013.01)

(58) Field of Classification Search
CPC ........... F24J 3/081; F24J 3/08; B01D 1/0058; B01D 1/22; B01D 1/0035; B01D 1/0088; B01D 5/006; B01D 1/00; C02F 1/16; C02F 2103/00; C02F 2103/08

USPC ...................................................... 202/185.3
See application file for complete search history.

(56) References Cited

U.S. PATENT DOCUMENTS

| | | | |
|---|---|---|---|
| 4,267,798 A * | 5/1981 | Collins ................. | A01K 63/00 119/229 |
| 8,083,902 B2 | 12/2011 | Al-Garni et al. | |
| 2003/0131623 A1 | 7/2003 | Suppes | |
| 2003/0221717 A1 | 12/2003 | Van Dessel | |

(Continued)

FOREIGN PATENT DOCUMENTS

FR   2847571   5/2004

OTHER PUBLICATIONS

Mattheus Goosen et al., Water Desalination Using Geothermal Energy, Energies, Jun. 22, 2010 (Goosen).*

*Primary Examiner* — Thomas Bennett McKenzie
(74) *Attorney, Agent, or Firm* — Richard C. Litman

(57) ABSTRACT

The water desalination system using geothermal energy includes a plurality of stepped evaporation trays. Salt water flows into the uppermost tray and cascades to each successively lower tray to overflow from the lowermost tray when all trays are full. Two sloped glass panels pass solar energy therethrough to heat the water. Condensation collects on the inner panel and runs down the panel to collect in a trough at the lower edge. The desalinated water then flows to a collection tank. Additional heat energy is provided by a working fluid (e.g., air) that is pumped to subterranean levels where significant geothermal heat is produced. The heated air is then circulated around the evaporation trays to enhance evaporation. The required energy for the operation of the system may be provided by solar cells and wind energy. Mirrors and functionally graded material further increase the efficiency of the desalination system.

7 Claims, 3 Drawing Sheets

(56) References Cited

U.S. PATENT DOCUMENTS

| | | | |
|---|---|---|---|
| 2004/0157519 A1* | 8/2004 | Goodell | B29C 70/088 442/181 |
| 2008/0075850 A1 | 3/2008 | Rock | |
| 2010/0088970 A1 | 4/2010 | Miller | |
| 2010/0314238 A1 | 12/2010 | Frolov et al. | |
| 2011/0139599 A1* | 6/2011 | Al-Garni | B01D 1/0035 202/173 |
| 2011/0271505 A1 | 11/2011 | St. Germain et al. | |

* cited by examiner

WATER DESALINATION SYSTEM USING GEOTHERMAL ENERGY

BACKGROUND OF THE INVENTION

1. Field of the Invention

The present invention relates generally to evaporative distillation systems, and particularly to a water desalination system using geothermal energy for a portion of the heating energy.

2. Description of the Related Art

Innumerable systems and devices have been developed in the past for the purpose of distilling and purifying various liquids. One environmental area in which this is particularly important is the arid areas of the Middle East, in which much of the potable water provided for the citizenry is produced from the evaporation of seawater.

All such distillation systems and devices require energy input for their operation. In many cases solar energy is used exclusively, but the use of only solar energy generally results in relatively inefficient production of pure water. Alternatively, many systems have been constructed to use energy input from other sources, e.g., heating by burning petroleum fuels, electrical energy produced by the burning of such fuels or other fossil fuels, etc. Such energy intensive systems are generally capable of producing a considerably greater volume of pure water than systems utilizing only solar energy, but the cost of water production is relatively high due to the cost of the energy used.

Accordingly, some development has taken place toward the use of other sources of economical energy. An example of such is found in French Patent No. 2,847,571, published on May 28, 2004. This reference describes (according to the drawings and English abstract) a seawater desalination system wherein cold seawater is send down a subterranean pipe to a depth sufficient to heat the water to over one hundred degrees Celsius. The heated water is then returned to a vaporizing and condensing system at the surface.

Thus, a water desalination system using geothermal energy solving the aforementioned problems is desired.

SUMMARY OF THE INVENTION

The water desalination system using geothermal energy includes a plurality of stepped evaporation trays for the salt water to be distilled. Salt water is piped into the uppermost tray, and overflow water cascades into each successively lower tray until reaching an overflow from the lowermost tray. Two sloped glass panels are disposed over the tops of the trays. Evaporated moisture from the trays condenses upon the lower surface of the lower glass panel. Air is blown between the two glass panels to assist in cooling their surfaces to enhance condensation on the lower panel. Desalinated water runs down the sloped lower surface of the lower glass panel and is collected in a trough below the lower edge of the lower glass panel. The desalinated water then drains to a collection tank.

The evaporative process is enhanced by energy input from economical energy sources, including geothermal heating. However, rather than piping the salt water directly to a subterranean source of heat, a recyclable heat exchanger fluid, e.g., air, is pumped to subterranean depths sufficient to heat the air significantly. The heated air then rises back to the evaporation trays where it is circulated beneath and around the trays to heat the salt water in the trays, thereby enhancing evaporation. In this manner, the volume of water in the evaporation trays and the volume of heat exchange fluid are independent of one another and may be adjusted individually, as desired.

Additional efficiency may be provided by constructing the tray enclosure of functionally graded material (FGM), which provides for the passage of heat energy therethrough in only one direction. Thus, when the ambient temperature is warmer than the temperature in the tray enclosure, the FGM panels allow heat energy to pass from the external ambient air to warm the trays and the water therein. When the temperature in the trays and water is warmer than the external ambient temperature, the FGM panels serve as thermal insulation to greatly reduce the dissipation of heat energy from the trays and water.

The electrical energy required to operate the cooling fan, the water and heat exchange pumps, and auxiliary electric heaters (if provided) is preferably provided by economical renewable energy sources, such as solar energy furnished by photovoltaic cells (solar cells) and wind energy. The orientation of the stepped evaporation trays and their sloped glass panels may be adjusted to optimize solar heating and, thus, evaporation of the water within the trays. Mirrors may also be provided to focus additional solar energy on the evaporation apparatus.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
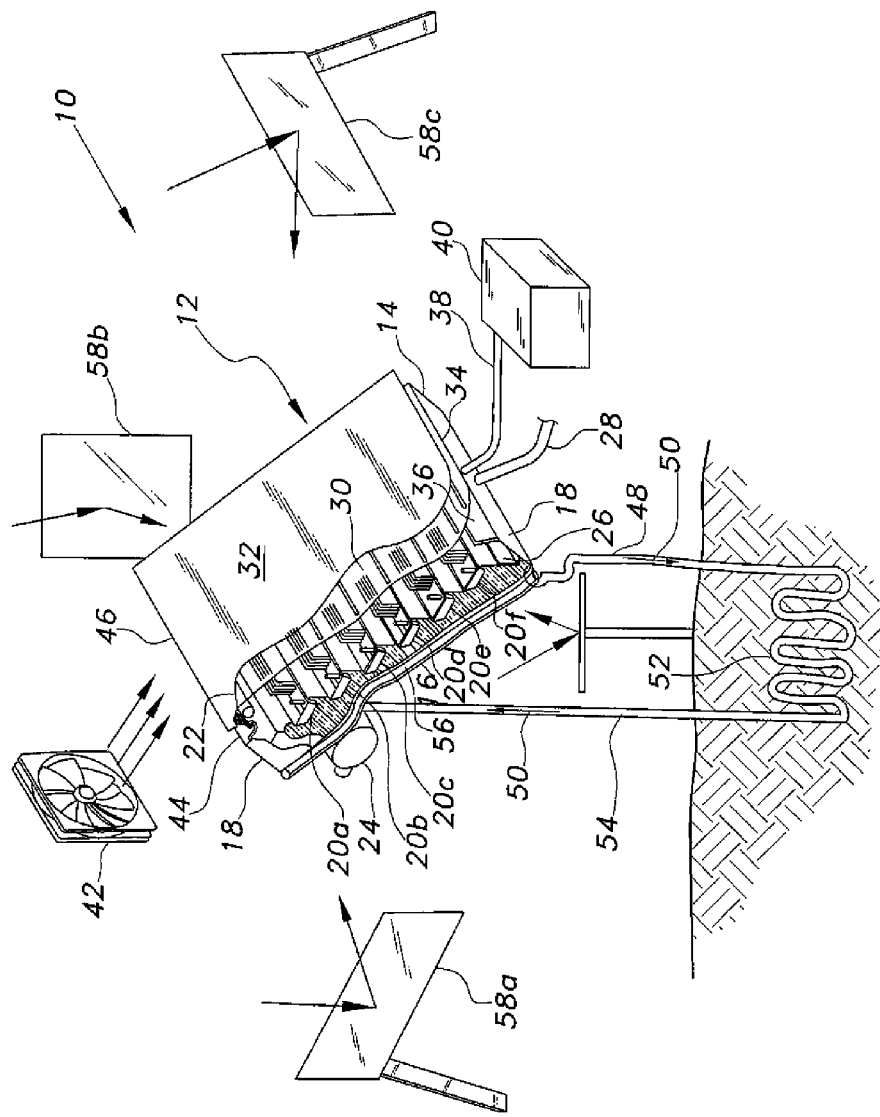
FIG. 1 is a diagrammatic perspective view of a water desalination system using geothermal energy according to the present invention, the evaporator and condenser apparatus being partially broken away to show various details thereof.
Figure 2:
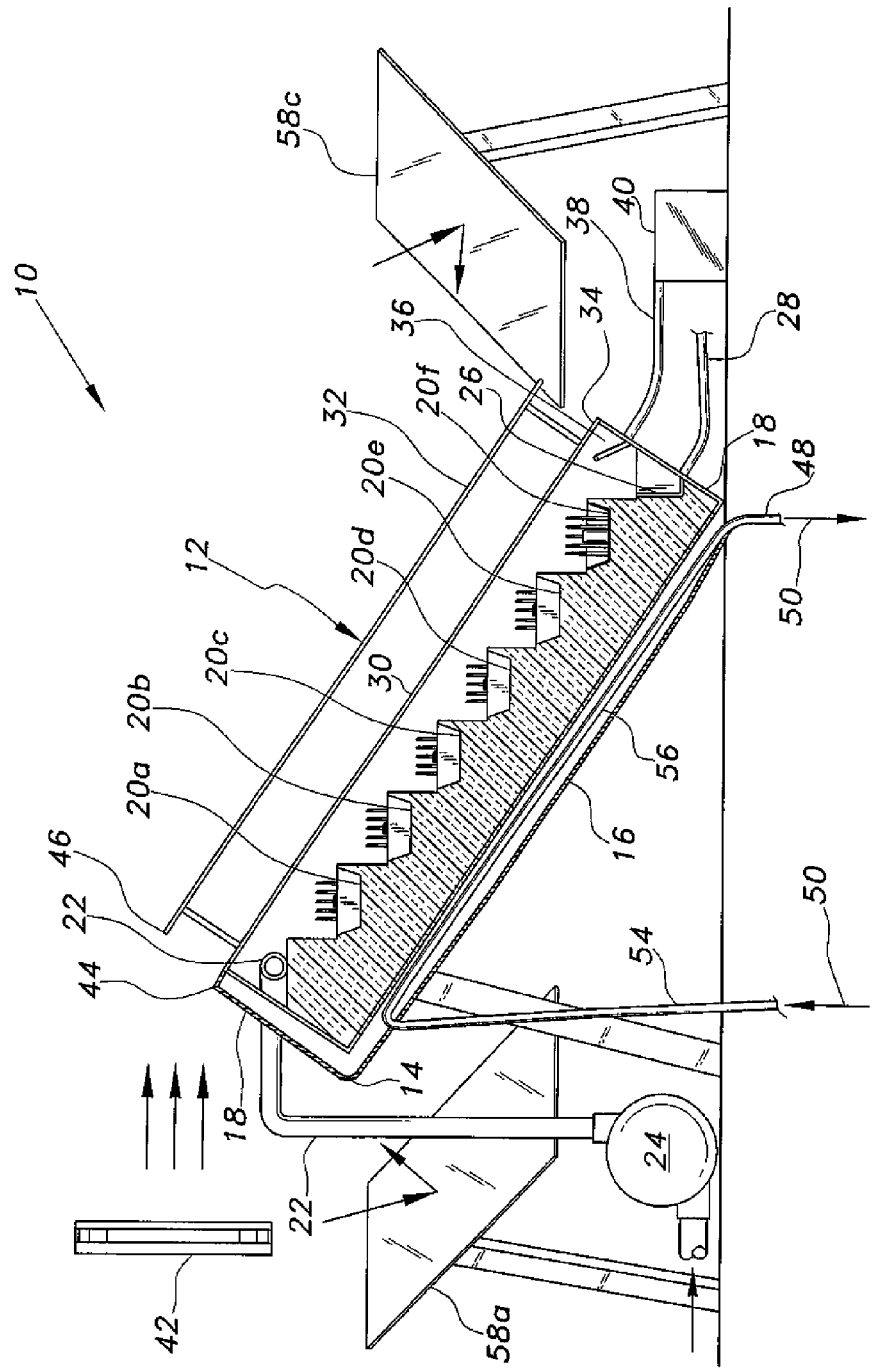
FIG. 2 is a diagrammatic side elevation view in section of the water desalination system of FIG. 1, illustrating further details thereof.

The water desalination system using geothermal energy incorporates a number of economical and environmentally beneficial energy sources to enhance the evaporative process for greater efficiency and lower operating costs. FIGS. 1 and 2 of the drawings provide diagrammatic environmental perspective and a side elevation views, respectively, of the water desalination system 10. The evaporator and condenser apparatus 12 is shown in section in both of those drawings. The evaporator and condenser apparatus 12 comprises a sloped evaporator tray housing 14 having the general form of a low box having an open top. The bottom 16 and sides and ends 18 of the box are preferably formed of sheets of functionally graded material (FGM) that permit the flow of thermal energy substantially in only one direction therethrough. The evaporator tray housing 14 is preferably constructed with the FGM sheets oriented to allow heat to pass from the outer, ambient air into the interior of the housing 14 when the ambient air is warmer than the interior of the housing in order to enhance the heating and evaporation of the salt water contained within the housing. However, the FGM substantially blocks heat transfer in the opposite direction, i.e., from the interior of the housing 14 to the ambient air, when the temperature within the housing 14 is warmer than the ambient air external to the housing. In this manner, the temperature within the housing 14 remains elevated to maximize evaporation. Such functionally graded material is formed of a metal and ceramic laminate, and has a predetermined "trigger temperature" causing the migration of carbides from the metal layer toward the ceramic layer to alter the thermal conductivity of the material. Such functionally graded material is conventional and known in the art.

An array of six evaporator trays is disposed within the sloped housing 14. The trays are stepped downward from an uppermost tray 20a to a lowermost tray 20f. It will be seen that more or fewer such evaporator trays may be provided for the evaporator apparatus 12, the size of the apparatus being scaled up or down as required. Salt water is piped into the uppermost tray 20a by a supply pipe 22 and supply pump 24. The water spills over from the uppermost tray 20a into the next lower tray 20b when the tray 20a is full. Water then flows from the second tray 20b into the next lower tray 20c when the tray 20b is full, and so on, until the lowermost tray 20f is full. Water from the full lowermost tray 20f spills over into a catch basin 26 disposed just below and adjacent to the tray 20f. Surplus salt water flows out from the catch basin 26 through a drain tube or pipe 28.

Two substantially parallel glass panels 30 and 32 are disposed above the stepped array of evaporator trays 20a through 20f. The two glass panels 30 and 32 are substantially parallel to one another, and are sloped to lie substantially parallel to the slope of the housing 14, as shown clearly in FIGS. 1 and 2. The lowermost glass panel 30 serves as a condensation surface for desalinated water evaporating from the evaporation trays 20a through 20f, and has a lowermost edge or end 34 and a purified water collection trough 36 disposed immediately therebelow. Condensation flows down the sloped undersurface of the lower glass panel 30 to the lowermost end 34 thereof, and then flows into the collection trough 36. The desalinated water then flows through a collection pipe or line 38 to a fresh water collection tank 40.

The lower and upper glass panels 30 and 32 define an air channel therebetween. A cooling fan 42 is situated adjacent the upper ends or edges 44 and 46 of the two panels to blow cooling air between the two panels 30 and 32. The cooling of (particularly) the lower glass panel 30 enhances the condensation of moisture thereon, thereby increasing the efficiency of the desalination system 10.

It is well known that the evaporation of a liquid increases directly with the temperature of the liquid due to the increase in vapor pressure with a rise in temperature. Accordingly, the water desalination system 10 includes means for increasing the temperature of the water within the evaporative trays 20a through 20f at minimal operating cost. A closed geothermal heat exchanger system comprises a downpipe 48 that extends from the evaporator and condenser apparatus 12 down to a relatively deep subterranean level, where the latent heat serves to heat a working fluid (e.g., air 50 or other fluid, indicated by the flow arrows) as it circulates through a plurality of deeply buried heat-exchanging pipes or tubes 52. The air or other working fluid then rises through a return pipe 54. The very warm fluid then circulates through an evaporator and condenser heat exchanger 56 below the trays 20a through 20f and back to the downpipe 48. The result is an efficient increase in the temperature of the salt water within the trays 20a through 20f at minimal operating cost.

Additional means are provided to provide further heat to the salt water in the trays 20a through 20f. In FIGS. 1 and 2, a plurality of mirrors 58a, 58b, and 58c are deployed about the evaporator and evaporator tray housing 14 to reflect sunlight onto the housing and thereby further heat the evaporator trays 20a through 20f therein. The reflected sunlight (and heat) provides additional heating, and thus evaporation, for the salt water in the trays 20a through 20f of the apparatus 12. The mirrors 58a through 58c may be angled to track the sun during its daily movement in order to keep the sunlight focused on the housing 14 at all times. The tracking mechanisms are not shown, but such tracking mechanisms for mirrors, directional antennas, etc., are well known and conventional.

Figure 3:
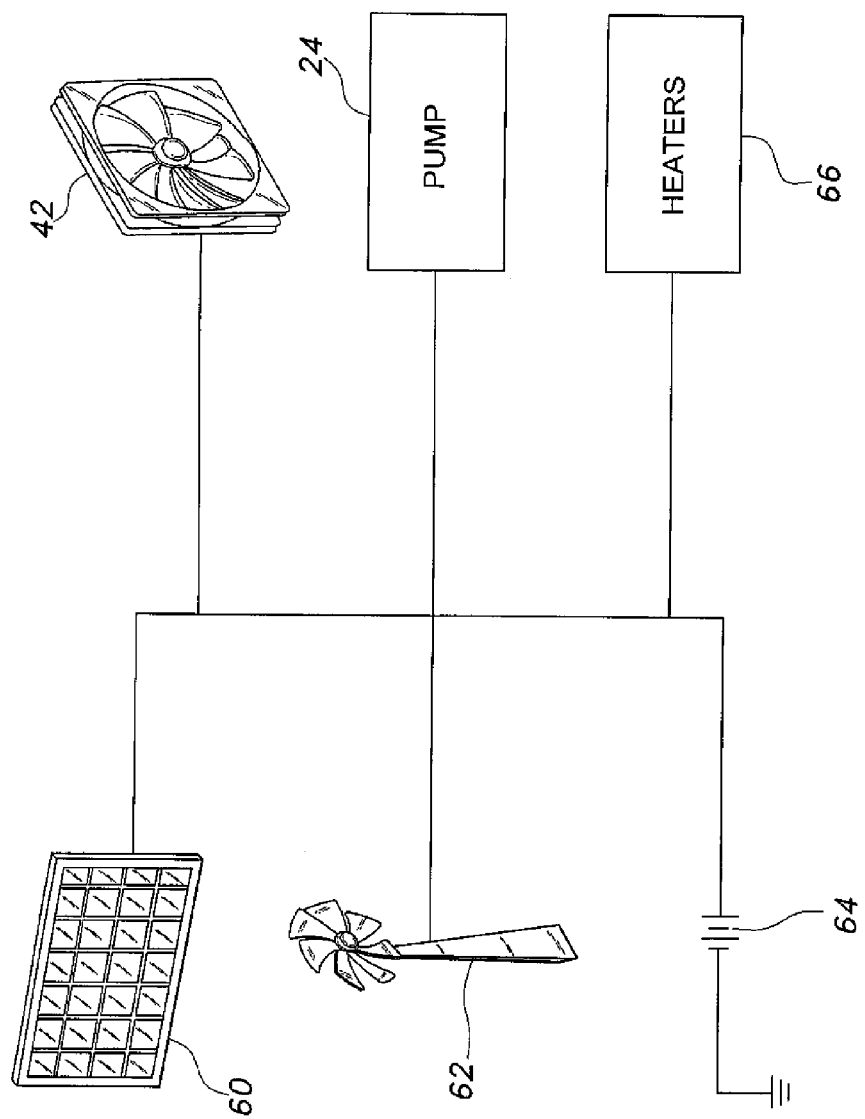
FIG. 3 is a block diagram of a water desalination system using geothermal energy according to the present invention, illustrating various alternative means for providing the energy required for operation of the system.

FIG. 3 provides a schematic view of the various systems that may be used to provide the power required to operate the water desalination system 10. Preferably, an environmentally beneficial or benign energy production device, such as solar cells 60, is used to provide the required electrical power for the supply pump 24 and heat exchange fluid pump. However, alternative energy sources, such as a wind turbine 62, may be provided, as desired. Surplus energy may be stored in an electrical storage battery 64 for use when solar and/or wind energy is not available. Any of the above energy sources may be used to provide the power required to operate the water desalination system 10, including energy to operate supplemental heating elements 66 (shown schematically in FIG. 3) to provide further heating for the evaporation trays 20a through 20f. The result of the above system is to provide pure, potable water at minimal cost for energy and equipment maintenance and upkeep.

It is to be understood that the present invention is not limited to the embodiments described above, but encompasses any and all embodiments within the scope of the following claims.

We claim:

1. A water desalination system using geothermal energy, comprising:
   a sloped evaporator tray housing formed from a functionally graded material for one-way thermal transfer therethrough;
   an plurality of successively stepped evaporator trays disposed within the housing, the evaporator trays ranging from an uppermost tray to a lowermost tray, each successively lower tray receiving overflow from the tray immediately above;
   a lower glass panel disposed above the evaporator trays and housing, the glass panel having a slope substantially parallel to the slope of the housing;
   a closed geothermal heat exchange system extending from the housing to a subterranean depth and back to the housing; and
   a heat exchange fluid circulating within the heat exchange system.

2. The water desalination system using geothermal energy according to claim 1, wherein
   the heat exchange system has at least one pipe disposed within the housing and beneath the evaporator trays.

3. The water desalination system using geothermal energy according to claim 1, further comprising:
   a catch basin disposed beneath and adjacent to the lowermost tray for receiving surplus salt water therefrom;
   a salt water drain pipe extending from the catch basin;
   a desalinated water collection trough disposed immediately below a lowermost end of the lower glass panel, the collection trough collecting condensation from the lower glass panel; and
   a fresh water collection tank communicating with the collection trough.

4. The water desalination system using geothermal energy according to claim 1, further comprising at least one mirror adapted to reflect solar energy upon the housing.

5. The water desalination system using geothermal energy according to claim 1, further comprising an upper glass panel disposed above the lower glass panel, the upper glass panel being substantially parallel to the lower glass panel, the lower glass panel and the upper glass panel each having an upper end.

6. The water desalination system using geothermal energy according to claim 5, further comprising a fan disposed adjacent the upper ends of the lower glass panel and the upper glass panel, the fan being adapted for blowing air between the lower glass panel and the upper glass panel.

7. The water desalination system using geothermal energy according to claim 1, further comprising at least one energy source selected from the group consisting of solar electric power, wind generators, and electrical battery power.

\* \* \* \* \*